United States Patent
Lim et al.

(10) Patent No.: US 9,241,352 B2
(45) Date of Patent: Jan. 19, 2016

(54) METHOD FOR ESTABLISHING A CONNECTION BETWEEN A NODE OF A COMMUNICATION SYSTEM AND A NODE OF A DATA SERVICE NETWORK IN A WIRELESS COMMUNICATION SYSTEM

(75) Inventors: Chae Gwon Lim, Seoul (KR); Song Yean Cho, Seoul (KR); Sung Ho Choi, Suwon-si (KR); Beom Sik Bae, Suwon-si (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 13/695,527

(22) PCT Filed: Apr. 27, 2011

(86) PCT No.: PCT/KR2011/003079
§ 371 (c)(1),
(2), (4) Date: Oct. 31, 2012

(87) PCT Pub. No.: WO2011/136555
PCT Pub. Date: Nov. 3, 2011

(65) Prior Publication Data
US 2013/0044724 A1 Feb. 21, 2013

(30) Foreign Application Priority Data
Apr. 30, 2010 (KR) .......................... 10-2010-0040450

(51) Int. Cl.
*H04W 76/02* (2009.01)

(52) U.S. Cl.
CPC .................................... *H04W 76/02* (2013.01)

(58) Field of Classification Search
CPC ...... H04L 45/02; H04W 72/04; H04W 80/04; H04W 8/26
USPC ........................................... 370/255, 329, 331
See application file for complete search history.

(56) References Cited

U.S. PATENT DOCUMENTS

2008/0240040 A1* 10/2008 Faccin ........................ 370/331
2009/0129342 A1* 5/2009 Hwang et al. ................ 370/331

FOREIGN PATENT DOCUMENTS

KR 10-2001-0056501 A 7/2001
KR 10-2009-0021046 A 2/2009

(Continued)

*Primary Examiner* — Mark Rinehart
*Assistant Examiner* — Natali N Pascual Peguero
(74) *Attorney, Agent, or Firm* — Jefferson IP Law, LLP

(57) ABSTRACT

A method for establishing a connection between a mobility management entity and a node of a network includes acquiring, at the mobility management entity, an address of the node, transmitting a session creation request from the mobility management entity to a serving gateway, receiving, at the mobility management entity, a session creation response from the serving gateway in response to the session creation request, the session creation response including uplink bearer information for data transmission to the serving gateway and an address allocated to the mobility management entity by a packet data network gateway, transmitting, at the mobility management entity, downlink bearer information for data reception from the serving gateway to the serving gateway, and communicating, at the mobility management entity, with the node using the address of the mobility management entity and the address of the node according to the uplink bearer information and the downlink bearer information.

10 Claims, 7 Drawing Sheets

(56) References Cited

FOREIGN PATENT DOCUMENTS

| KR | 10-2009-0060583 A | 6/2009 |
| KR | 10-2009-0118871 A | 11/2009 |
| WO | WO 2011079873 A1 * | 7/2011 |

* cited by examiner

METHOD FOR ESTABLISHING A CONNECTION BETWEEN A NODE OF A COMMUNICATION SYSTEM AND A NODE OF A DATA SERVICE NETWORK IN A WIRELESS COMMUNICATION SYSTEM

BACKGROUND OF THE INVENTION

1. Field of the Invention

The present invention relates to a mobile communication system and method and, in particular, to a method for establishing a connection between a communication system node and a data service network node in the mobile communication system.

2. Description of the Related Art

Typically, Universal Mobile Telecommunication System (UMTS) is a 3rd Generation mobile communication systems based on Wideband Code Division Multiple Access (WCDMA) evolved from Global System for Mobile communications (GSM) and General Packet Radio Service (GPRS). The 3rd Generation Partnership Project (3GPP) for standardization of UMTS proposes the next generation communication system (Evolved Packet System; EPS) such as Long Term Evolution (LTE) system. LTE is a technology for implementing the high speed packet-based communication.

The current system is inefficient in that the operator has to participate, whenever necessary, in establishing an IP connection between a user data network node and communication system node. There is therefore a need of a method for establishing a connection between the user data network node and a communication system node automatically and efficiently.

DISCLOSURE OF INVENTION

Technical Problem

The present invention has been made in an effort to solve the above problem, and it is an object of the present invention to provide a method and apparatus for establishing a connection between a user data network node and a communication system node efficiently.

Solution to Problem

In accordance with an aspect of the present invention, a method for establishing a connection between a mobility management entity and a node of a network includes acquiring, at the mobility management entity, an address of the node; transmitting a session creation request from the mobility management entity to a serving gateway; receiving, at the mobility management entity, a session creation response from the serving gateway in response to the session creation request, the session creation response including uplink bearer information for data transmission to the serving gateway and an address allocated to the mobility management entity by a packet data network gateway; transmitting, at the mobility management entity, downlink bearer information for data reception from the serving gateway to the serving gateway; and communicating, at the mobility measurement entity, with the node using the address of the mobility management entity and the address of the node according to the uplink bearer information and the downlink bearer information.

In accordance with another aspect of the present invention, a method for establishing a connection between a base station and a node of a network acquiring, at the base station, an identification address of the node; transmitting, at the base station, a session creation request to a mobility management entity; receiving, at the base station, a session creation response from the mobility management entity in response to the session creation request, the session creation response including uplink bearer information for data transmission to the mobility management entity and an address allocated to the base station by a packet data network gateway; transmitting downlink bearer information from the base station to the mobility management entity for the eNB to receive data from the mobility management entity; and communicating, at the base station, with the node using the identification address of the base station and the identification address of the node according to the uplink bearer information and the downlink bearer information.

In accordance with still another aspect of the present invention, a communication system for configuring a connection between a mobility management entity and a node of a network includes a packet data network gateway which allocates an identification address to the mobility management entity upon receipt of a session creation request (Create Session Request) and transmits to a serving gateway a session creation response including the identification address and uplink bearer information for data communication to the packet data network gateway; a serving gateway which delivers the session creation request received from the mobility management entity to the packet data network gateway and delivers the session creation response received from the packet data network gateway to the mobility management entity; and a mobility management entity which acquires, the identification address of the node, transmits the session creation request to the serving gateway, receives the session creation response from the serving gateway in response to the session creation request—the session creation response includes uplink bearer information for data transmission to the serving gateway and the identification address allocated to the mobility management entity by the packet data network gateway—, transmits to the serving gateway the downlink bearer information for data reception from the serving gateway, and communicates with the node using the identification address of the mobility management entity and the identification address of the node according to the uplink bearer information and the downlink bearer information.

Detailed features of other embodiments will be provided in the following section of the detailed descriptions and the drawings.

Advantageous Effects

The present invention is advantageous in establishing a connection between a user data network node and a communication system node efficiently.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
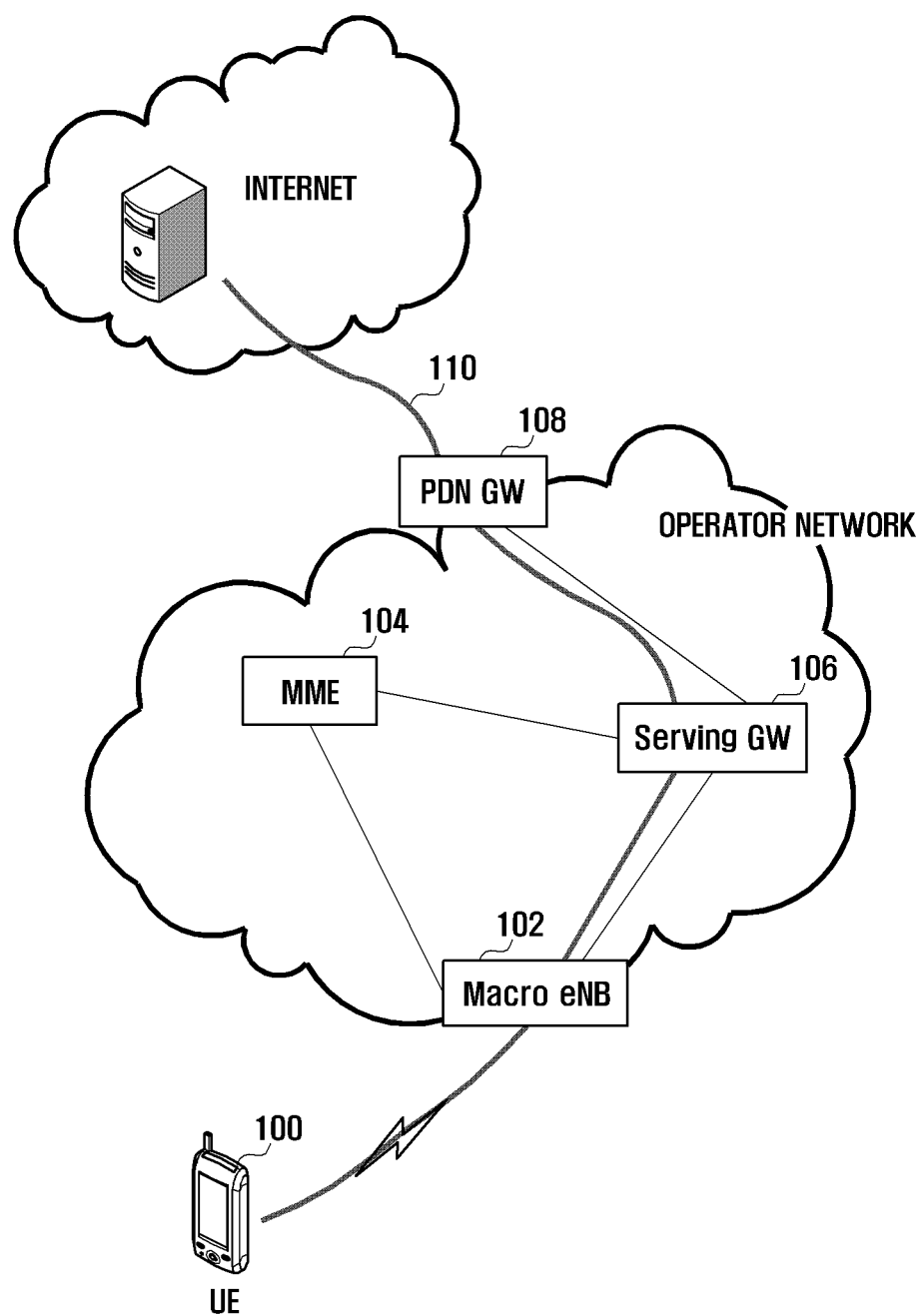
FIG. 1 is a block diagram illustrating a mobile communication system according to an embodiment of the present invention.

FIG. 1 is a block diagram illustrating a mobile communication system according to an embodiment of the present invention. Referring to FIG. 1, the mobile communication system according to an embodiment of the present invention includes a Macro enhanced Node B (Macro eNB) 102, a Mobility Management Entity (MME), a Serving Gateway (S-GW) 106, a Packet Data Network Gateway (P-GW) 108, and a User Equipment (UE) 100.

The Macro eNB 102 is the eNB in charge of a macro cell. Although the macro cell is a normal cell of a cellular system and the macro eNB 102 is an eNB which manages and controls the macro cell, the terms 'macro cell' and 'macro eNB' may be interchangeably used in the present invention for the convenience sake. In the following description, the macro eNB 102 is also referred to as eNB 102.

The macro eNB 102 establishes a radio channel with the UE 100 and controls the radio resource. For example, the macro eNB 102 is capable of generating and broadcasting control information necessary within the macro cell and allocating radio resource for communicating data and control signal with the UE 100. At this time, the broadcast system information includes PLMN ID as the information on the operator supported by the eNB, eNB Cell Global ID (ECGI) as eNB cell information, Tracking Area ID as information on the area to which each cell belongs, etc. also, the macro eNB 102 is capable of collecting channel measurement result information of the current cell and neighbor cells from the UE 100 and analyses this information to determine and command handover. In order to accomplish this, the macro eNB 102 is provided with the control protocol such as radio resource management-related Radio Resource Control Protocol.

The MME 104 manages the UE in the idle mode and selects the P-GW and S-GW 106. The MME 104 is also capable of performing the functions related to Roaming and Authentication. The MME 104 also processes the bearer signal generated by the UE 100. Typically, the message exchanged between the MME 104 and the UE 100 is referred to as Non-Access Stratum (NAS) message.

When the UE performs handover between macro eNBs or roams across the 3GPP radio networks such as LTE and UMTS/GSM, the S-GW 106 works as the mobility anchor.

The P-GW 108 allocates Internet Protocol (IP) address to the UE 100, performs packet data-related function of the core network, and works as a mobility anchor for roaming across 3GPP and non-3GPP radio networks. The P-GW 108 also determines the bearer band for a subscriber and is responsible for packet data forwarding and routing functions.

Typically, S1-MME interface is defined between the eNB 102 and the MME 104, and S1-U interface between the eNB 102 and the S-GW 106, and S5 interface between the S-GW 106 and the P-GW 108.

In addition, the Home Subscriber Server (HSS) (not shown) stores subscription information per UE and, when the UE 100 connects to the network, sends the UE information to the MME 104 in order for the MME 104 to control the UE 100.

When it has attached to the macro eNB 102, the UE 100 accesses the data network through the data transfer paths established via the macro eNB 102, S-GW 106, and P-GW 108.

Typically, in the radio communication network, the UE 100 establishes the connection with the macro eNB 102 and then transmits a NAS Request message to the MME 104. At this time, the NAS Request message can be any of Attach Request, Tracking Area Update Request, and Service Request messages.

In order to provide various communication services in the radio communication system, it is necessary for the node on a user data network and the node on a communication system network to communicate with each other.

In an exemplary case of the Machine type communication system, it is necessary to support communication between the machine type communication server placed on the user data network and the mobility management entity (or eNB) of the communication system for controlling the machine type communication terminal (sensor or metering device). This is because it is advantageous to exchange the policy or report related to the machine type communication terminal control between the machine type communication server and the MME (or eNB) from the view point of network management efficiency.

Figure 2:
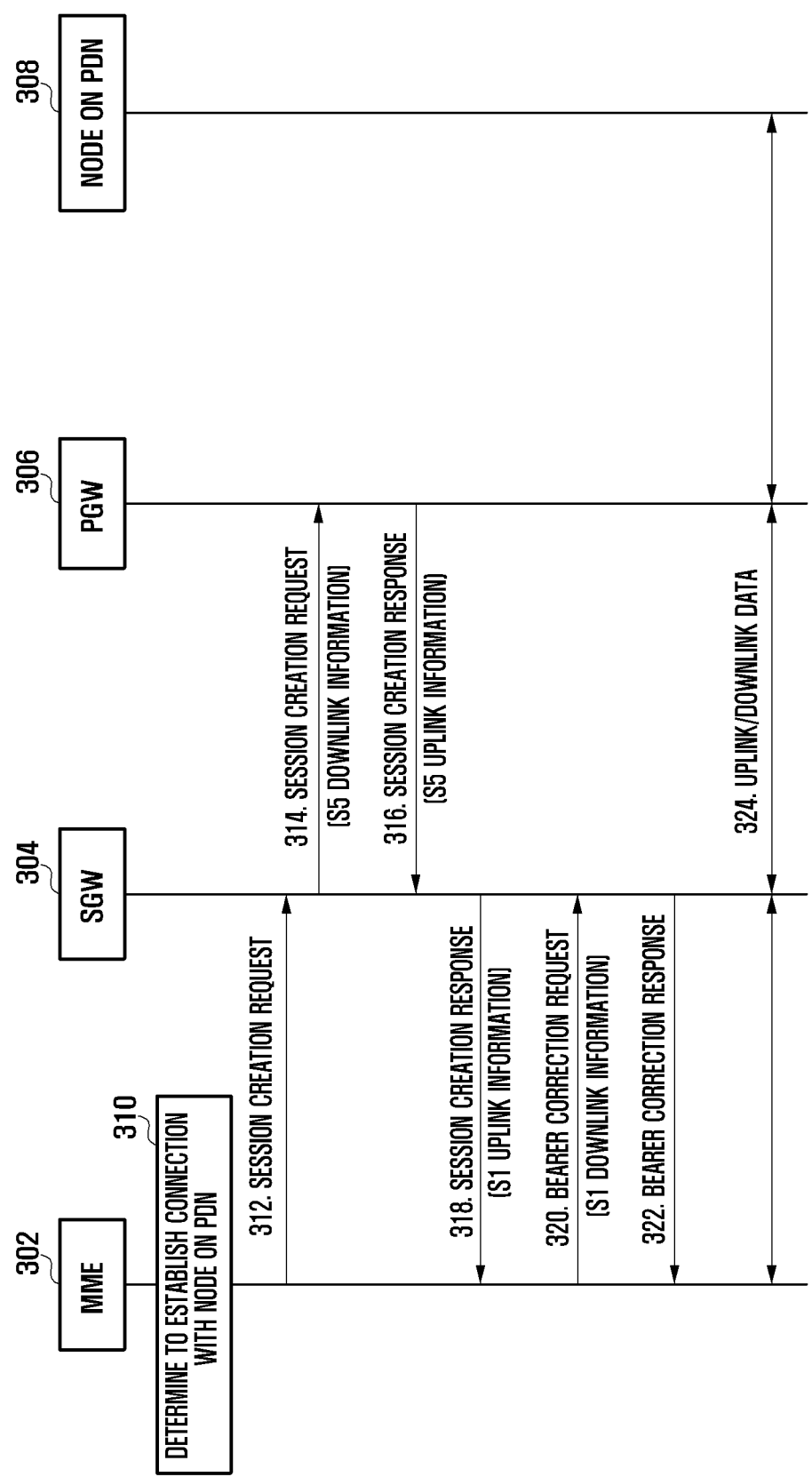
FIG. 2 is signal flow diagram illustrating a procedure of establishing a connection between the MME 302 and a data network node 308 according to the first embodiment of the present invention.

FIG. 2 is signal flow diagram illustrating a procedure of establishing a connection between the MME 302 and a data network node 308 according to the first embodiment of the present invention.

Referring to FIG. 2, the MME 302 determines to establish a connection with the node 308 on the data network at step 310. The MME 302 is a node of the radio communication system as described with reference to FIG. 1. At this time, the MME 302 is capable of retaining the address (e.g. IP address) of the node 308 for establishing the data network node 308. The address of the data network node 308 can be transferred to the MME 302 by the UE, HSS, or other entity.

For example, the MME 302 is capable of determining establishment of a connection with the data network node 308 to exchange the UE control policy or report.

The MME 302 requests the S-GW 304 to generate a new S1-U bearer at step 312 and, upon receipt of the request, the S-GW 304 requests the P-GW 306 to generate a downlink S5 bearer along with the downlink S5 bearer information at step 314. The P-GW 306 transmits to the S-GW 304 a response message in response to the bearer generation request of step 314 along with the uplink S5 bearer information at step 316. The P-GW 306 is also capable of allocating an address, e.g. IP address, to the MME 302. The response message of step 316 may include the address allocated to the MME 302. The S-GW 304 transmits to the MME 302 a response message in response to the S1-U bearer generation request of step 312 along with the address which the P-GW 306 has allocated to the MME 302 at step 318. The MME 304 delivers the downlink S1-U bearer information to the S-GW 304 at step 320 and receives a response in reply to the request of 320 at step 322. Accordingly, the MME 302 is capable of communicating data with the data network node 308 via S1 bearer—S-GW 304-S5 bearer—P-GW 306 at step 324. In this data communication, the identification address of the node 308 and the identification address which the P-GW 306 has allocated to the MME 302 are used. That is, the node 308 and the MME 302 communicate with each other using the identification address of the node 308 and the identification address of the MME 302.

Figure 3:
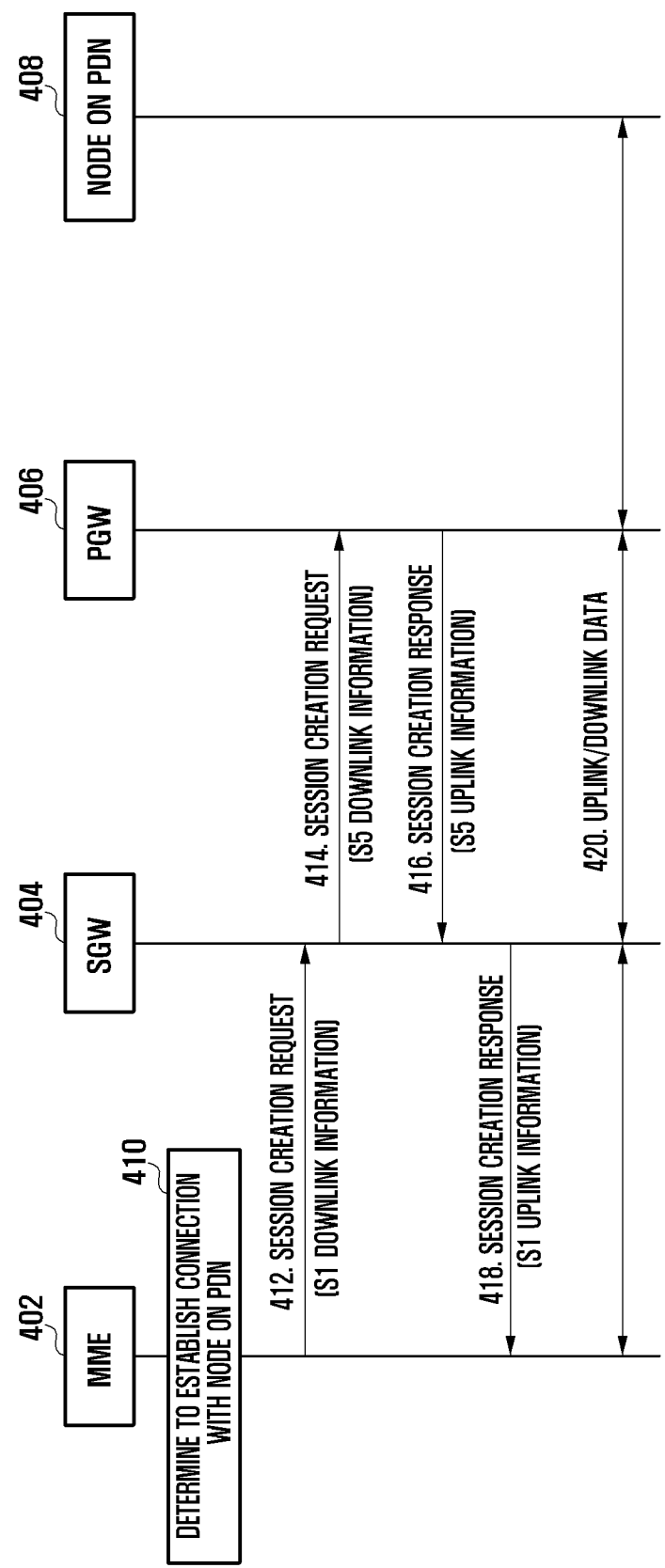
FIG. 3 is a signal flow diagram illustrating a procedure for establishing a connection between the MME 402 and the data network node 408 according to the second embodiment of the present invention.

FIG. 3 is a signal flow diagram illustrating a procedure for establishing a connection between the MME 402 and the data network node 408 according to the second embodiment of the present invention.

Referring to FIG. 3, the MME 402 determines to establish a connection with the node 408 of the data network at step 410. The MME 402 is a node of the mobile communication system as described with reference to FIG. 1. At this time, the MME 402 is capable of retaining the address (e.g. IP address) of the node 408 for establishing the connection with the data network node 408. The address of the data network node 408 can be transferred to the MME 402 by the UE, HSS, or other entity.

For example, the MME 402 is capable of determining establishment of a connection with the data network node 408 to exchange the UE control policy or report.

The MME 402 requests the S-GW 404 to generate a new S1-U bearer with S1-U bearer information at step 412 and, upon receipt of the request, the S-GW 404 requests the P-GW 406 to generate a downlink S5 bearer with the downlink S5 bearer information at step 414. The P-GW 406 transmits to the S-GW 404 a response message in response to the bearer generation request of step 414 along with the uplink S5 bearer information at step 416. The P-GW 406 is also capable of allocating an address, e.g. IP address, to the MME 402. The response message of step 416 is capable of including the address which the P-GW 406 has allocated to the MME 402. The S-GW 404 transmits to the MME 302 a response message in response to the S1-U bearer generation request of step 412 along with the uplink S1-U bearer information and the address which the P-GW 406 has allocated to the MME 402 at step 418. Accordingly, the MME 402 is capable of communicating data with the data network node 408 via S1 bearer—S-GW 304-S5 bearer—P-GW 306 at step 420. In this data communication, the identification address of the node 408 and the identification address which the P-GW 406 has allocated to the MME 402 are used. That is, the node 408 and the MME 402 communicate with each other using the identification address of the node 408 and the identification address of the MME 402.

Figure 4:
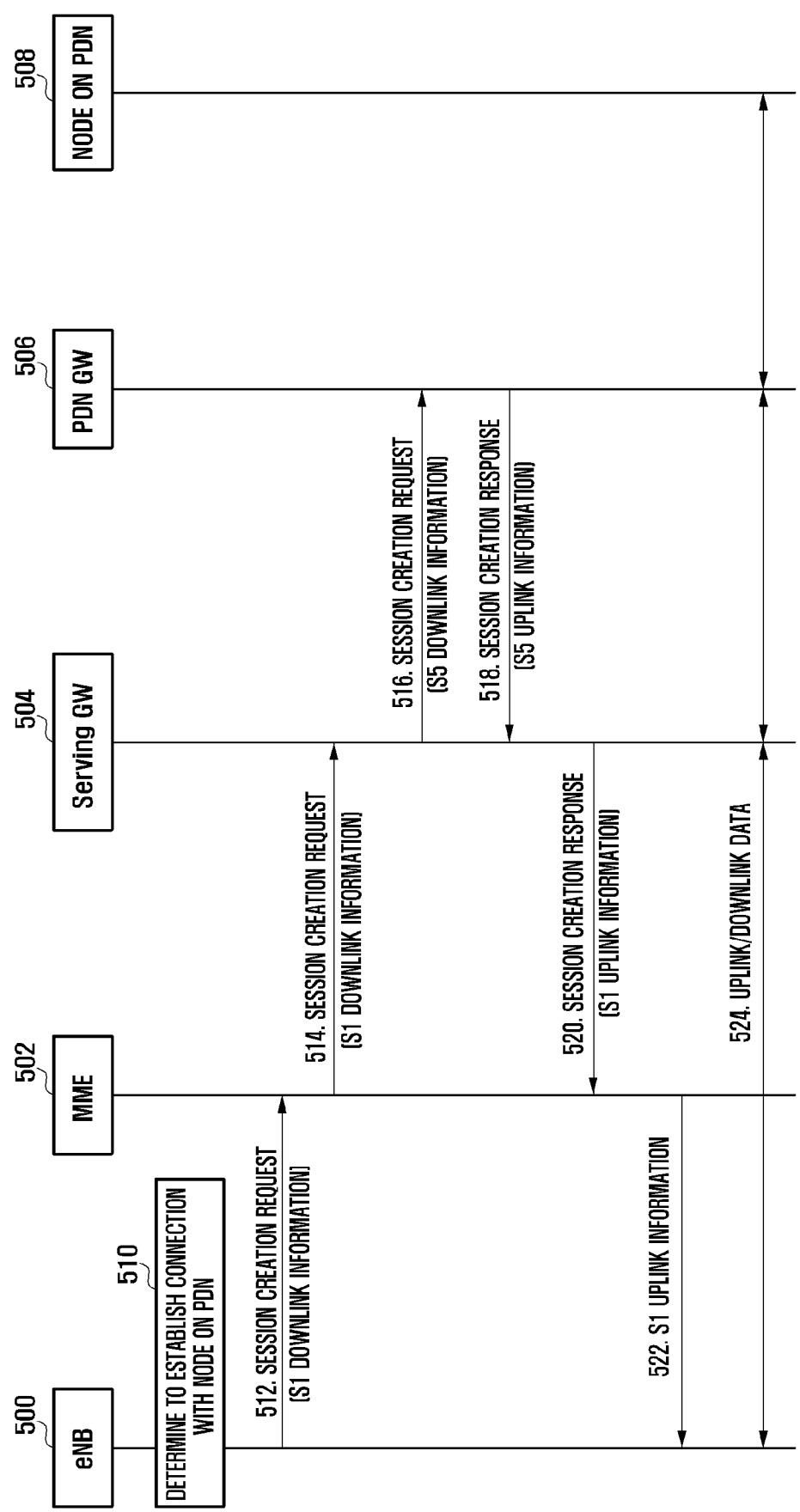
FIG. 4 is a signal flow diagram illustrating a procedure for establishing a connection between the eNB 500 and the data network nod e 508 according to the third embodiment of the present invention.

FIG. 4 is a signal flow diagram illustrating a procedure for establishing a connection between the eNB 500 and the data network nod e 508 according to the third embodiment of the present invention.

Referring to FIG. 4, the eNB 500 determines to establish a connection with the node 508 on the data network at step 510. The eNB 500 is a node of the mobile communication system as described with reference to FIG. 1. At this time, the eNB 500 is capable of retaining the address (e.g. IP address) of the node 508 for establishing the connection with the data network node 508. The address of the node 508 can be transferred to the eNB 500 by the UE, HSS, or other entity.

The eNB 500 is capable of determining the connection with the data network node 508 to exchange the UE control policy or report.

The eNB 500 transmits a PDN connection request message to the MME 502 along with the downlink S1-U information at step 512. The MME 502 requests the S-GW 504 to generate a new S1-U bearer with the downlink S1-U bearer information and, upon receipt of the request at step 514, the S-GW 504 requests the P-GW 506 to generate a new S5 bearer with the downlink S5 bearer information at step 516. The P-GW 506 transmits a response message to the S-GW 504 in response to the bearer generation request of step 516 along with the uplink S5 bearer information at step 518. The P-GW 506 allocates an address, e.g. IP address, to the eNB 500. The response message of step 518 includes the address which the P-GW 506 has allocated to the eNB 500. The S-GW 504 transmits a response message to the MME 502 along with the uplink S1-U bearer information and the address which the P-GW 506 has allocated to the eNB 500 in response to the S1-U bearer generation request of step 514 at step 520. The MME 504 transmits to the eNB 522 the uplink S1-U bearer information along with the address which the P-GW 506 has allocated to the eNB 500. Accordingly, the eNB 500 is capable of communicating data with the data network node 508 via S1 bearer—S-GW 504-S5 bearer—P-GW 506 at step 524. In this data communication, the identification address of the node 508 and the identification address which the P-GW 506 has allocated to the eNB 500 are used. That is, the node 508 and the eNB 500 communicate with each other using the identification address of the node 508 and the identification address of the eNB 500.

Figure 5:
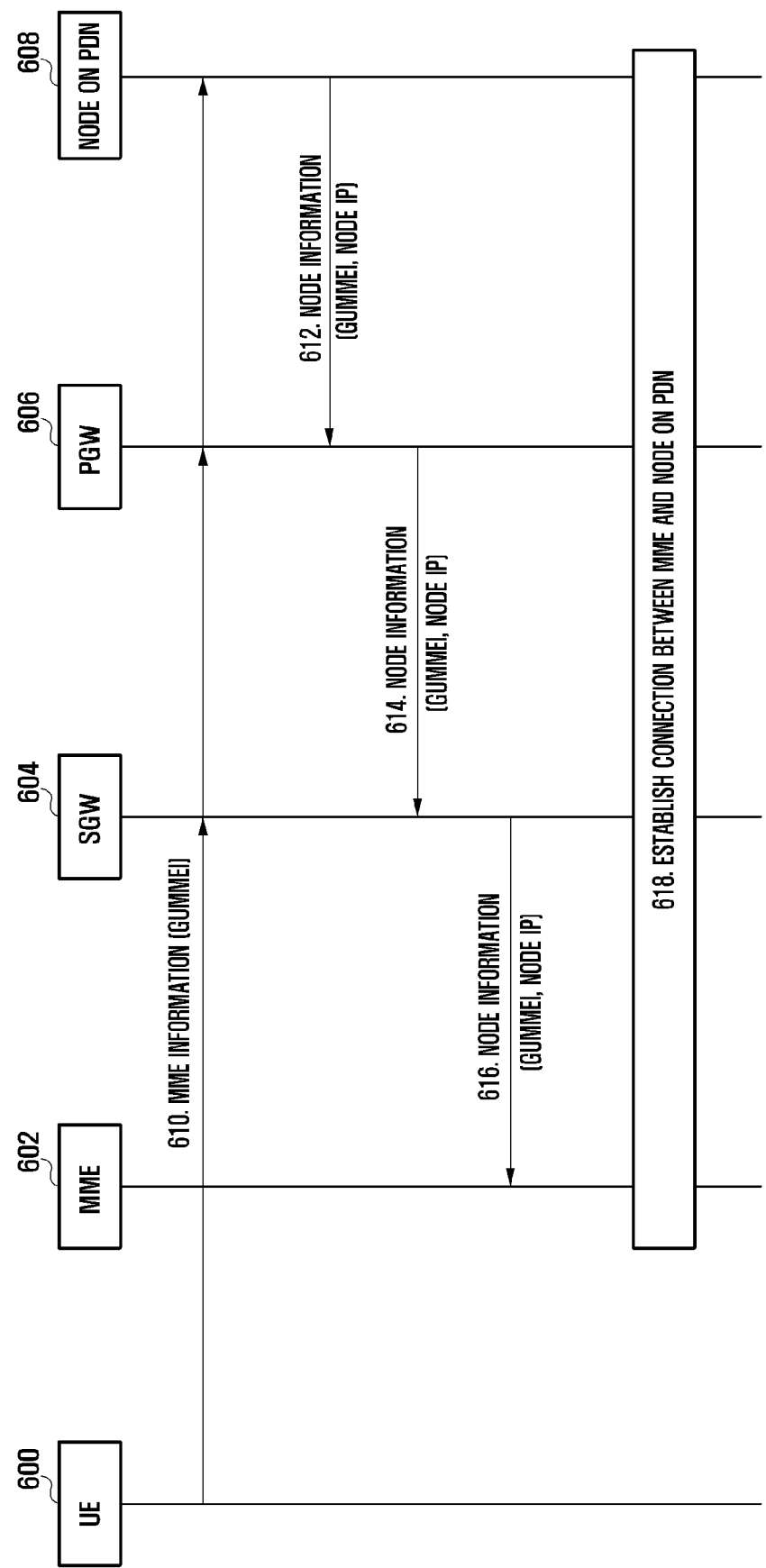
FIG. 5 is a signal flow diagram illustrating a procedure of transferring an identification address of the node 608 on the data network from the node 608 to the MME 602 according to the fourth embodiment of the present invention.

FIG. 5 is a signal flow diagram illustrating a procedure of transferring an identification address (e.g. IP address) of the node 608 on the data network from the node 608 to the MME 602 according to the fourth embodiment of the present invention.

Referring to FIG. 5, the UE 600 connected to the data network transmits Global Unique MME ID (GUMMEI) to the node 608 on the data network at step 610. The data network node 608 transmits its own information and the MME information to the P-GW 606. At this time, a Policy & Charging Rule Function (PCRF) (not shown) or an Application Function (AF) (not shown) may participate in the node information message transfer between the node 608 and the P-GW 606, if necessary. The P-GW 606 transmits the node information to the S-GW 604 at step 614, and the S-GW 604 delivers the node information, as indicated, to the MME 602 at step 614. Finally, the MME 602 is capable of establishing the connection with the data network node 608 according to the first or second embodiment of the present invention at step 618.

Figure 6:
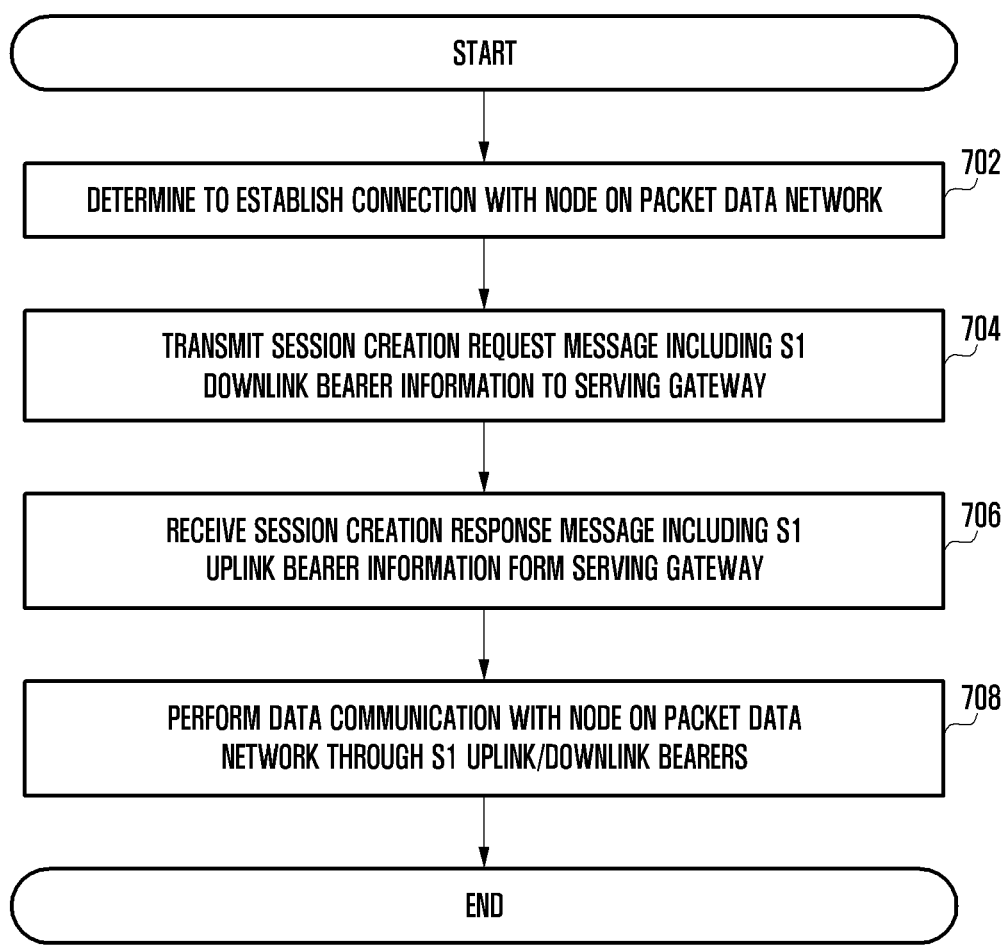
FIG. 6 is a flowchart illustrating an operation procedure of the MME 402 according to the second embodiment of the present invention.

FIG. 6 is a flowchart illustrating an operation procedure of the MME 402 according to the second embodiment of the present invention. Referring to FIG. 6, the MME 402 determines to establish a connection with the data network at step 702. The MME 402 transmits the session creation request message including downlink S1-U bearer information to the S-GW 404 at step 704. The MME 402 receives a session creation response message including uplink S1-U bearer information from the S-GW 404 at step 706. Finally, the MME 402 performs data communication with the data network node 408 through uplink/downlink S1-U bearer at step 708.

Figure 7:
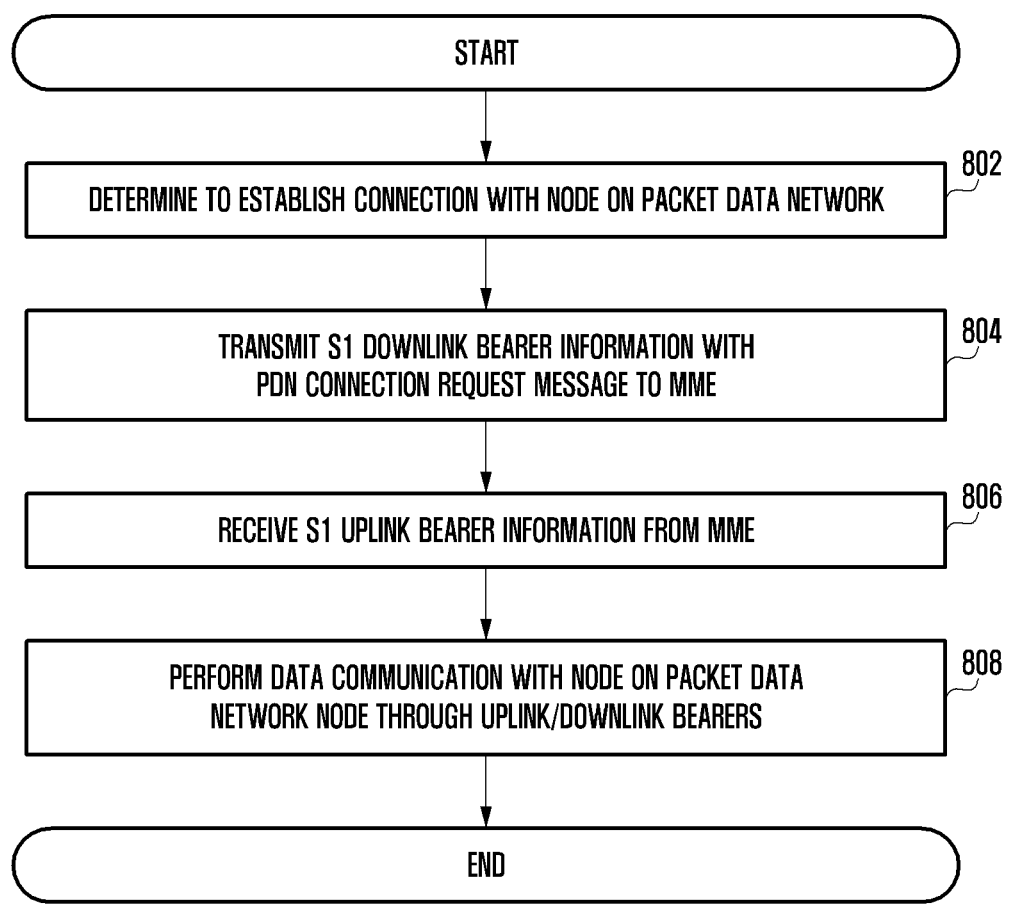
FIG. 7 is a flowchart illustrating an operation procedure of the eNB 500 according to the third embodiment of the present invention.

FIG. 7 is a flowchart illustrating an operation procedure of the eNB 500 according to the third embodiment of the present invention. Referring to FIG. 7, the eNB 500 determines to establish a connection with the data network at step 802. The eNB 500 transmits a PDN connection request message including downlink S1-U bearer information to the MME 502 at step 804. The eNB 500 receives the uplink S1-U bearer information form the MME 502. Finally, the eNB 500 performs data communication with the data network node through the uplink/downlink S1-U bearer at step 808.

The specification and drawings are to be regarded in an illustrative rather than a restrictive sense in order to help understand the present invention. It is obvious to those skilled in the art that various modifications and changes can be made thereto without departing from the broader spirit and scope of the invention.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Industrial Applicability

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a connection between a mobility management entity and a node of a network by the mobility management entity, the method comprising: acquiring an address of the node; transmitting a session creation request to a serving gateway; receiving a session creation response from the serving gateway in response to the session creation request, the session creation response including uplink bearer information for transmitting data to the serving gateway and an address allocated to the mobility management entity by a packet data network gateway; transmitting, to the serving gateway, downlink bearer information for receiving data from the serving gateway; and transmitting and receiving data with the node based on the address of the mobility management entity and the address of the node using a bearer between the mobility management entity and the serving gateway created based on the uplink bearer information and the downlink bearer information, wherein each of the addresses is an Internet Protocol (IP) address.

2. The method of claim 1, wherein the downlink bearer information is transmitted to the serving gateway along with the session creation request.

3. The method of claim 1, wherein acquiring the address of the node comprises acquiring the address of the node from the node which has transmitted identity information of the mobility measurement entity.

4. The method of claim 1, further comprising:
transmitting, at the serving gateway receiving the session creation request, the session creation request including downlink bearer information for receiving data from the packet data network gateway to the packet data network gateway; and
allocating, at the packet data network gateway received the session creation request, the address to the mobility management entity, and transmitting to the serving gateway the session creation response including the address of the mobility management entity and the uplink bearer information for receiving data from the serving gateway.

5. A method for establishing a connection between a mobility management entity and a node of a network by a serving gateway, comprising: receiving a session creation request from the mobility management entity; transmitting, to a packet data network gateway, the session creation request including downlink bearer information for receiving data from the packet data network gateway; receiving, from the packet data network gateway in response to the session creation request, a session creation response including an address of the mobility management entity allocated by the packet data network gateway and uplink bearer information for transmitting data to the packet data network gateway; transmitting, to the mobility management entity, the session creation response including uplink bearer information for receiving data from the mobility management entity and the address allocated to the mobility management entity by the packet data network gateway; receiving, from the mobility management entity, downlink bearer information for transmitting data to the mobile management entity; and transmitting and receiving data between the mobility management entity and the node based on the address of the mobility management entity and an address of the node which is acquired by the mobility management entity, using a first bearer between the mobility management entity and the serving gateway and a second bearer between the serving gateway and the packet data network gateway, wherein the first and second bearers are created based on the uplink bearer information and the downlink bearer information, and wherein each of the addresses is an Internet Protocol (IP) address.

6. A method for establishing a connection between a mobility management and a node of a network by a packet data network gateway, comprising: receiving, from a serving gateway, a session creation request including downlink bearer information for transmitting data to the serving gateway; allocating an address to the mobility management entity; transmitting, to the serving gateway in response to the session creation request, a session creation response including the address of the mobility management entity and uplink bearer information for receiving data from the serving gateway; and transmitting and receiving data between the mobility management entity and the node based on the address of the mobility management entity and an address of the node which is acquired by the mobility management entity, using a bearer created based on the uplink bearer information and the downlink bearer information, wherein each of the addresses is an Internet Protocol (IP) address.

7. A mobility management entity comprising: a transceiver for transmitting and receiving signal; and a controller controlled for acquiring an address of a node of a network, for transmitting a session creation request to a serving gateway, for receiving a session creation response from the serving gateway in response to the session creation request, the session creation response including uplink bearer information for transmitting data to the serving gateway and an address allocated to the mobility management entity by a packet data network gateway, for transmitting, to the serving gateway, downlink bearer information for receiving data from the serving gateway, and for transmitting and receiving data with the node based on the address of the mobility management entity and the address of the node using a bearer between the mobility management entity and the serving gateway created based on the uplink bearer information and the downlink bearer information, wherein each of the addresses is an Internet Protocol (IP) address.

8. The mobility management entity of claim 7, the controller is controlled for transmitting the downlink bearer information along with the session creation request.

9. A serving gateway comprising: a transceiver for transmitting and receiving signal; and a controller controlled for receiving a session creation request from a mobility management entity, for transmitting, to a packet data network gateway, the session creation request including downlink bearer information for receiving data from the packet data network gateway, for receiving, from the packet data network gateway in response to the session creation request, a session creation response including an address of the mobility management entity allocated by the packet data network gateway and uplink bearer information for transmitting data to the packet data network gateway, for transmitting, to the mobility management entity, the session creation response including uplink bearer information for receiving data from the mobility management entity and the address allocated to the mobility management entity by the packet data network gateway, for receiving, from the mobility management entity, downlink bearer information for transmitting data to the mobile management entity, and for transmitting and receiving data between the mobility management entity and a node of a network based on the address of the mobility management entity and an address of the node which is acquired by the mobility management entity, using a first bearer between the mobility management entity and the serving gateway and a second bearer between the serving gateway and the packet data network gateway, wherein the first and second bearer are created based on the uplink bearer information and the downlink bearer information, and wherein each of the addresses is an Internet Protocol (IP) address.

10. A packet data network gateway comprising: a transceiver for transmitting and receiving signal; and a controller controlled for receiving, from a serving gateway, a session creation request including downlink bearer information for transmitting data to the serving gateway, for allocating an address to a mobility management entity, for transmitting, to the serving gateway in response to the session creation request, a session creation response including the address of the mobility management entity and uplink bearer information for receiving data from the serving gateway, and for transmitting and receiving data between the mobility management entity and a node of a network based on the address of the mobility management entity and an address of the node which is acquired by the mobility management entity, using a bearer created based on the uplink bearer information and the downlink bearer information, wherein each of the addresses is an Internet Protocol (IP) address.

* * * * *